US012700418B1

(12) United States Patent
Helwani et al.

(10) Patent No.: US 12,700,418 B1
(45) Date of Patent: Aug. 4, 2026

(54) PER FRAME INPUT ESTIMATION FOR POST FILTER ECHO SUPPRESSION

(71) Applicant: Amazon Technologies, Inc., Seattle, WA (US)

(72) Inventors: Karim Helwani, San Mateo, CA (US); Michael Mark Goodwin, Scotts Valley, CA (US); Erfan Soltanmohammadi, Silver Spring, MD (US)

(73) Assignee: Amazon Technologies, Inc., Seattle, WA (US)

( * ) Notice: Subject to any disclaimer, the term of this patent is extended or adjusted under 35 U.S.C. 154(b) by 172 days.

(21) Appl. No.: 18/617,498

(22) Filed: Mar. 26, 2024

(51) Int. Cl.
| | |
|---|---|
| *G10L 21/00* | (2013.01) |
| *G10L 21/0232* | (2013.01) |
| *G10L 25/30* | (2013.01) |
| *H04M 3/00* | (2006.01) |
| *G10L 21/0208* | (2013.01) |
| *G10L 21/0216* | (2013.01) |

(52) U.S. Cl.
CPC .......... *G10L 21/0232* (2013.01); *G10L 25/30* (2013.01); *H04M 3/002* (2013.01); *G10L 2021/02082* (2013.01); *G10L 2021/02163* (2013.01)

(58) Field of Classification Search
None
See application file for complete search history.

(56) References Cited

U.S. PATENT DOCUMENTS

| | | | |
|---|---|---|---|
| 8,041,028 B2 | 10/2011 | Adeney | |
| 8,160,262 B2 | 4/2012 | Buck | |
| 8,645,129 B2 * | 2/2014 | LeBlanc | ............... G10L 19/012 |
| | | | 704/226 |

(Continued)

FOREIGN PATENT DOCUMENTS

| | | | | |
|---|---|---|---|---|
| CN | 117649854 A * | 3/2024 | ......... | G10L 21/0264 |

OTHER PUBLICATIONS

Z. Zhang et al., "Two-Step Band-Split Neural Network Approach For Full-Band Residual Echo Suppression," ICASSP 2023—2023 IEEE International Conference on Acoustics, Speech and Signal Processing (ICASSP), Rhodes Island, Greece, 2023, pp. 1-2, ( Year: 2023).*

(Continued)

*Primary Examiner* — Shreyans A Patel
(74) *Attorney, Agent, or Firm* — S. Scott Foster; Kowert, Hood, Munyon, Rankin & Goetzel, P.C.

(57) ABSTRACT

Per frame inputs for post filter echo suppression are determined. Captured audio data of a two-way communication that includes a far-end signal played via a speaker may be processed as different sub-bands of individual frames. A machine learning model may be applied that is trained to accept the different sub-bands of a frame and corresponding sub-bands of a corresponding frame of the far-end audio data as inputs to generate outputs that can be used as post-filter inputs for the frame. The post-filter inputs that are output from the machine learning model may include an attenuation parameter, near-end estimate and echo estimate. A post filter (Continued)

may be applied to the different sub-bands of the frame sing the post-filter inputs to remove echo data caused by the far-end audio data in the captured audio data.

20 Claims, 6 Drawing Sheets

(56) References Cited

U.S. PATENT DOCUMENTS

| | | | |
|---|---|---|---|
| 8,712,068 B2 | 4/2014 | Christoph | |
| 10,546,593 B2 | 1/2020 | Wung | |
| 11,393,487 B2 * | 7/2022 | Fazeli | G10L 21/0208 |
| 2009/0238373 A1 * | 9/2009 | Klein | H04M 9/082 |
| | | | 381/66 |
| 2018/0077290 A1 * | 3/2018 | Zargar | H04M 9/082 |
| 2022/0293120 A1 * | 9/2022 | Fazeli | G10L 21/0208 |

OTHER PUBLICATIONS

Chen, Kai, et al. "An improved post-filter of acoustic echo canceller based on subband implementation." Applied acoustics 70.6 (2009): 886-893. (Year: 2009).*

* cited by examiner

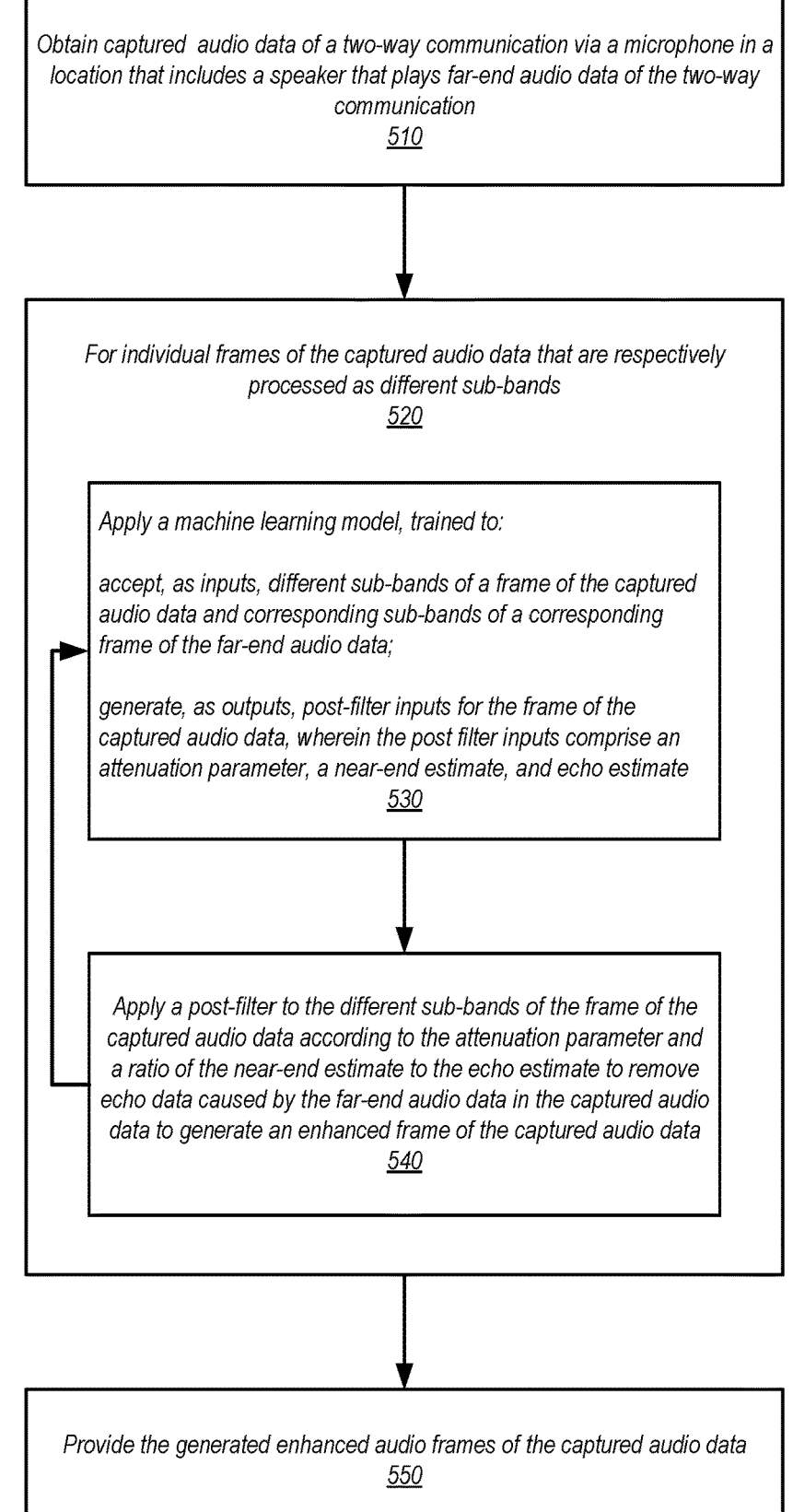

*Obtain captured audio data of a two-way communication via a microphone in a location that includes a speaker that plays far-end audio data of the two-way communication*
*510*

*For individual frames of the captured audio data that are respectively processed as different sub-bands*
*520*

*Apply a machine learning model, trained to:*

*accept, as inputs, different sub-bands of a frame of the captured audio data and corresponding sub-bands of a corresponding frame of the far-end audio data;*

*generate, as outputs, post-filter inputs for the frame of the captured audio data, wherein the post filter inputs comprise an attenuation parameter, a near-end estimate, and echo estimate*
*530*

*Apply a post-filter to the different sub-bands of the frame of the captured audio data according to the attenuation parameter and a ratio of the near-end estimate to the echo estimate to remove echo data caused by the far-end audio data in the captured audio data to generate an enhanced frame of the captured audio data*
*540*

*Provide the generated enhanced audio frames of the captured audio data*
*550*

*FIG. 5*

PER FRAME INPUT ESTIMATION FOR POST FILTER ECHO SUPPRESSION

BACKGROUND

Audio enhancement techniques (e.g., for captured human speech) have been implemented to improve the performance of audio communications. Machine learning techniques, for example, have been applied to increase the clarity of different characteristics of captured audio data. As audio data for communications may be captured in various scenarios, audio enhancement techniques may be implemented that account for these various scenarios.

BRIEF DESCRIPTION OF THE DRAWINGS

FIG. 5 illustrates a high-level flowchart of various methods and techniques to implement per frame input estimation for post-filter echo suppression, according to some embodiments.

Figure 1:
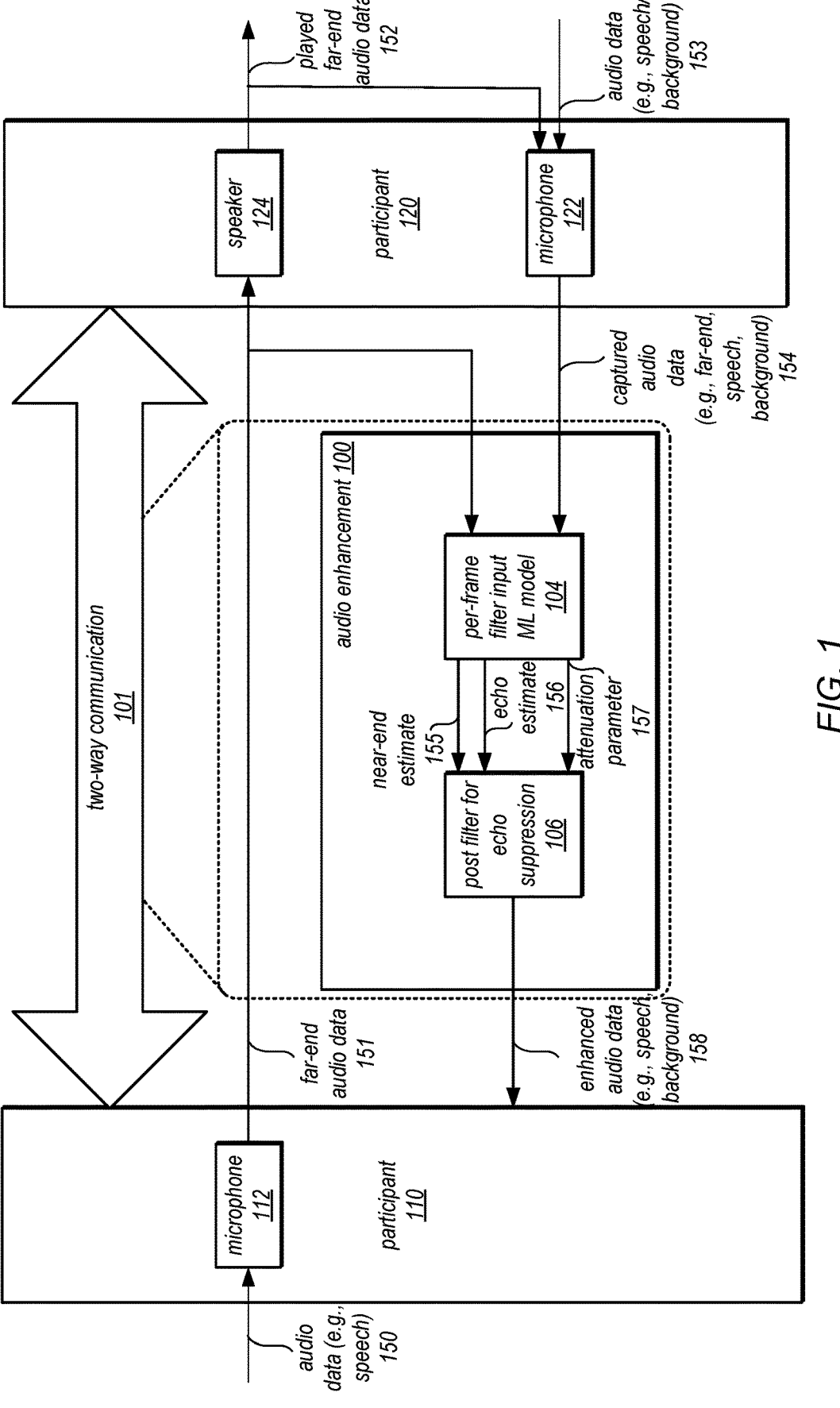
FIG. 1 illustrates a logical block diagram of per frame input estimation for post-filter echo suppression, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

In full-duplex communication applications, echo produced by the acoustic feedback from the loudspeaker to the microphone can severely degrade quality. In order to remove the echo, many applications may remove both echo and suppress noise at the same time. Many techniques have been proposed to accomplish these two tasks simultaneously. In digital signal processing (DSP) based approaches, a noise estimate is added to an echo estimate and the resulting quantity is subtracted from the captured audio data in a form of spectral subtraction. In machine learning (ML) based solutions, the clean speech (e.g., a clean signal for speech features alone that are captured by a microphone) is used as the target signal during training of ML models which allows the ML model to only preserve the speech features and remove everything else. Sometimes speech-based features like pitch are also used to enable the network to achieve this goal more easily.

However, there are applications in which it is desirable to preserve the background noise, or where speech is not the only target signal. For example, in emergency calls preserving the background noise may be important. In another example, there might be an audio session where music is intended to be transmitted in addition to (or instead of) speech. In such scenarios, speech-based features may not be reliable to preserve the audio data captured by a microphone that is the target signal to be transmitted. Another challenge is that most automatic speech recognition (ASR) models are trained on a massive speech dataset without including any specific echo canceller or denoiser in the signal path. Instead, they may require that the echo canceller impose a minimal distortion on the near end signal and preserve the natural background noise as it is expected to be in the signal by ASR. Accordingly, implementing techniques that remove or otherwise suppress echo alone in order to preserve the background noise, and that are not limited to preserving speech, may impose minimal distortion when enhancing the captured audio signal.

In various embodiments, techniques for per frame input estimation for post-filter echo suppression may provide echo control that removes echo without eliminating other audio (e.g., speaker audio, background audio, music, etc.). A machine learning model may be trained to provide input parameters, such as the echo estimate, near-end estimate and the attenuation parameter for a post filter echo suppression feature, such a Wiener filter, in order to remove the echo alone. Because input estimation is performed by the model on a per-frame basis, inputs can dynamically change to adapt to the changing soundscape that may be captured. In some embodiments, enhancements may be performed in the sub-band domain, so that attenuation may be determined and applied to each sub-band in a frame. Such techniques provide a dynamic and granular approach to providing enhanced audio data that removes echo without removing other desired audio, improving the performance of those applications in which echo removal alone is desirable as well as machine learning based audio enhancement more generally.

Figure 3A:
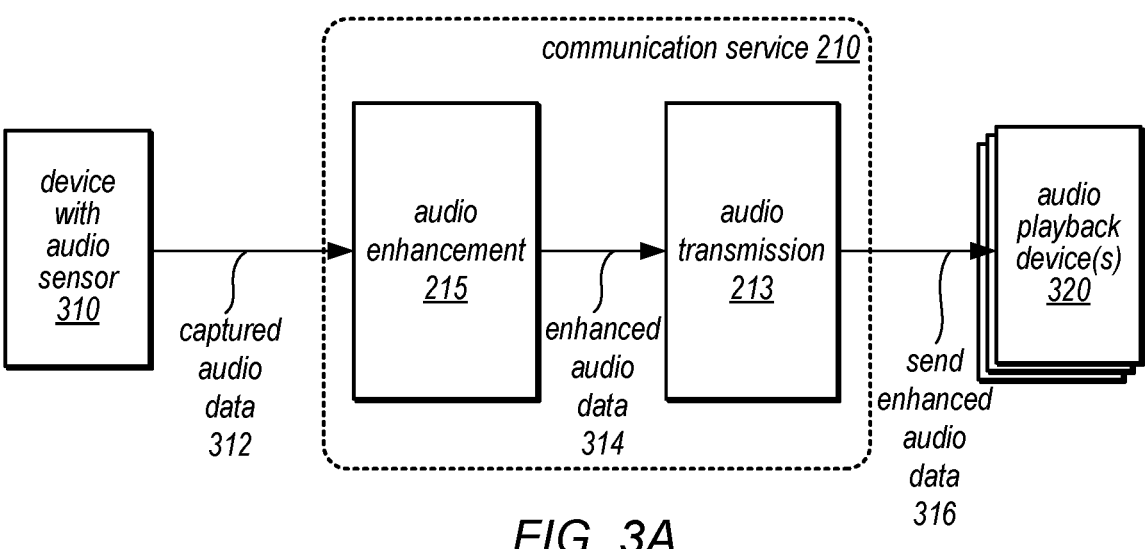
FIGS. 3A-3B illustrate logical block diagrams of different interactions of an audio sensor with provider network services that implement audio enhancement, including per frame input estimation for post-filter echo suppression, according to some embodiments.

FIG. 1 illustrates a logical block diagram of per frame input estimation for post-filter echo suppression, according to some embodiments. Audio enhancement 100 may be implemented as part of various network-based systems or services or stand-alone systems or devices, that receive audio data (e.g., speech audio and various background audio) and provide as output enhanced audio (e.g., removing echo). For example, an audio enhancement 100 may be implemented "service-side," as illustrated in FIG. 3A, where the communication device that captures the audio data may be separate from a service or system that implements audio enhancement system 100 (e.g., audio enhancement system 100 is separate from near-end communication device 110). In such embodiments, the audio data may be sent from the communication device (e.g., over a network connection) to the system or service for audio enhancement, as discussed below with regard to FIG. 3A. In other embodiments, audio enhancement 100 may be implemented as part of a same communication device as the audio sensor (e.g., as part of an audio processing component or system implemented within a device that includes an audio sensor, such as a mobile phone or device, including various types of "smart" phones, "smart" loudspeakers, "smart" televisions, content delivery or audio/video streaming devices that capture audio data using microphones, and so on), as discussed below with regard to FIG. 3B.

Audio enhancement 100 may implement per frame input estimation for post-filter echo suppression to remove echo from audio data captured at the far-end. For example, per-frame filter input ML model 104, such as the example model described in detail below with regard to FIG. 4, may be trained to estimate outputs that are input to a post filter for echo suppression 106, including near-end estimate 155, echo estimate 156, and attenuation parameter 157. Per-frame filter input ML model 104 may be trained using inputs of the captured audio data 154 from a microphone 122 which, as indicated at 152 may capture the far-end audio data played by speaker 124 in a same location as microphone 122. Played far-end audio data may be the far-end audio data 151 transmitted as part of two way communication 101 between participants 110 and 120, captured by microphone 112 from audio data (e.g., a speaker at participant 110).

As illustrated in FIG. 1, audio enhancement 100 may be implemented in a two-way communication 101, in various embodiments. Two-way communication 101 may be a fully duplex communication for audio data, between two (or more) participants (e.g., 110 and 120) on two (or more) communication devices. Two-way communication 101 may be an example of a multi-way communication which may be a fully duplex communication between multiple participants. A fully duplex communication may occur when data can flow in both directions at the same time, allowing two (or more) participants (with varying numbers of one or more participants distributed amongst different devices or locations) receiving and transmitting audio data as part of the same communication (e.g., a two-way video conference, a three-way video conference, a four-way video conference, and so on). In some embodiments, video data may also be communicated in addition to the audio data. In the example illustrated, two-way communication is implemented between two different participants (e.g., using one or more respective communication devices), participant 110 and participant 120. Communication devices for participants may respectively implement sensors for capturing audio data, such as microphones 112 and 122, and speakers or other playback devices for providing transmitted audio data, such as speaker 124 (participant 110 may have a speaker, but it is not illustrated). As noted above, echo may occur when a microphone 122 for participant 120 captures some portion of audio data transmitted from participant 110 (e.g., far-end audio data 151) and played via speaker 124. This "echo"

data may be reduced or removed according to the various techniques described with regard to audio enhancement 100.

For example, post filter for echo suppression 106 may be a Wiener filter, in some embodiments. A Wiener filter may refer to filter that can compute an estimate of an unknown signal, such as the echo signal, using a related signal, such as a near-end-to-echo ratio, as an input and filtering that known signal to produce the estimate as an output. To do this, in various embodiments, the captured audio data (e.g., 153), which may be a discrete time domain signal may be indexed by parentheses and the corresponding sub-band domain with brackets. That is, x(n) is a discrete time domain signal where n denotes the discrete time index and x[l, k] is the sub-band domain representation where l is the bin index and k is the block time index. Accordingly, echo cancellation may be performed in a sub-band domain. For each sub-band l, and block time index k, the magnitude of the microphone signal may be modified by applying a mask defined as $$\mu[i, k] = \left( \frac{v[l, k]}{v[l, k] + 1} \right)^{a[l,k]} \tag{1}$$

where $v[l, k]$ is near-end-to-echo ratio. In the context of echo cancelation, this ratio is the ratio between the energy of the nearend and energy of the echo. $\alpha[l, k]$ is an attenuation parameter for over-suppression during single-talk far-end scenarios. This parameter gives more flexibility to suppress more when the bin is occupied mostly by echo. In one embodiment, $\alpha$, $v$, and $\mu$ are all positive real quantities.

To estimate the attenuation parameter, per-frame input ML model 104 may have one dedicated output that gives the attenuation parameter. In some embodiments, this attenuation parameter may be denoted in the Bark scale denoted by $\alpha_B[i, k]$, where subscript B is used to indicate the signal is in the bark scale, i denotes an index to a band in the Bark scale for $0 \leq i < n_b$ and $n_b$ is the total number of Bark bands. In other embodiments, no scaling may be applied. For those embodiments that use the Bark scale, per-frame input ML model 104 gives $n_b$ values for each block time index k. The sub-band may be denoted as the bark scale matrix by B. Then, the following equation may calculate the Bark scale from the sub-band domain representation:

$$x_B[i, k] = \frac{\sum_{l=0}^{n_f} B[i, l] x_m[l, k]}{b[i]} \text{ for } i = 0 \text{ to } n_b - 1 \tag{2}$$

where subscript M is used to denote the magnitude of a complex signal, $x_M[l, k]$ is the magnitude of a sub-band signal in bin l and for block time index k, b[i] denotes the sub-band to bark normalization factor for the $i^{th}$ bark band and $n_f$ denotes the number of bins in the sub-band domain.

The following equation may be used to expand the bark scale representation back to the sub-band domain scale, $$x_M[l, k] = \sum_{i=0}^{n_b} x_B[i, k] B[i, l] \text{ for } l = 0 \text{ to } n_f - 1 \tag{3}$$

Therefore, to obtain $\alpha$ from $\alpha_B$, the following may be used, $$\alpha[l, k] = \sum_{i=0}^{n_b} \alpha_B[i, k] B[i, l] \text{ for } l = 0 \text{ to } n_f - 1 \tag{4}$$

Note that when scaling the signal from sub-band to bark and inverse, the magnitude values of the signal may be used and the phase value will be ignored. After the final estimate of the magnitude of the near-end is obtained, the original phase from the microphone may be used to reconstruct the near-end.

To calculate $v$, the model 104's other two outputs may be used. The first one is the echo estimate mask $\rho_B$ which when multiplied by the microphone signal gives an echo estimate 156. The second one is the near-end estimate mask, $\beta_B$, which when multiplied by the microphone signal, gives the near-end estimate 155. Both of these outputs are in the bark scales. First, use Eq. (2) to obtain echo estimate mask, $\rho$, and the near-end estimate mask, $\beta$, in the sub-band scale. Then, calculate the prior estimate of magnitude of the near-end, $\hat{s}_M$, using $$\hat{s}_M[i, k] = \rho[i, k]m_M[i, k] \qquad (5)$$

where $m_M$ is the magnitude of the microphone signal. To estimate the echo signal, the following may be used, $$\hat{d}_\rho[i, k] = \rho[i, k]m_M[i, k] \qquad (6)$$

Then, $v$ may be given by $$v[i, k] = \frac{\hat{s}_M[i, k]}{\hat{d}_\rho[i, k] + \epsilon} \qquad (7)$$

where $\epsilon$ is a small number to avoid division by 0. After calculating $v$, mask may be calculated using Eq. (1). Then, the final estimate of the magnitude of the near-end signal may be determined according to:

$$\hat{s}_M[i, k] = \mu[i, k]m_M[i, k] \qquad (8)$$

Please note that the previous descriptions of an audio enhancement 100 enhancement is a logical illustration and thus is not to be construed as limiting as to the implementation of an audio enhancement that provides per frame input estimation for post-filter echo suppression.

This specification continues with a general description of a provider network that implements multiple different services, including a communication service, which may implement per frame input estimation for post-filter echo suppression for two-way audio communication enhancement. Then various examples of, including different components/modules, or arrangements of components/module that may be employed as part of implementing the services are discussed. A number of different methods and techniques to implement per frame input estimation for post-filter echo suppression are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
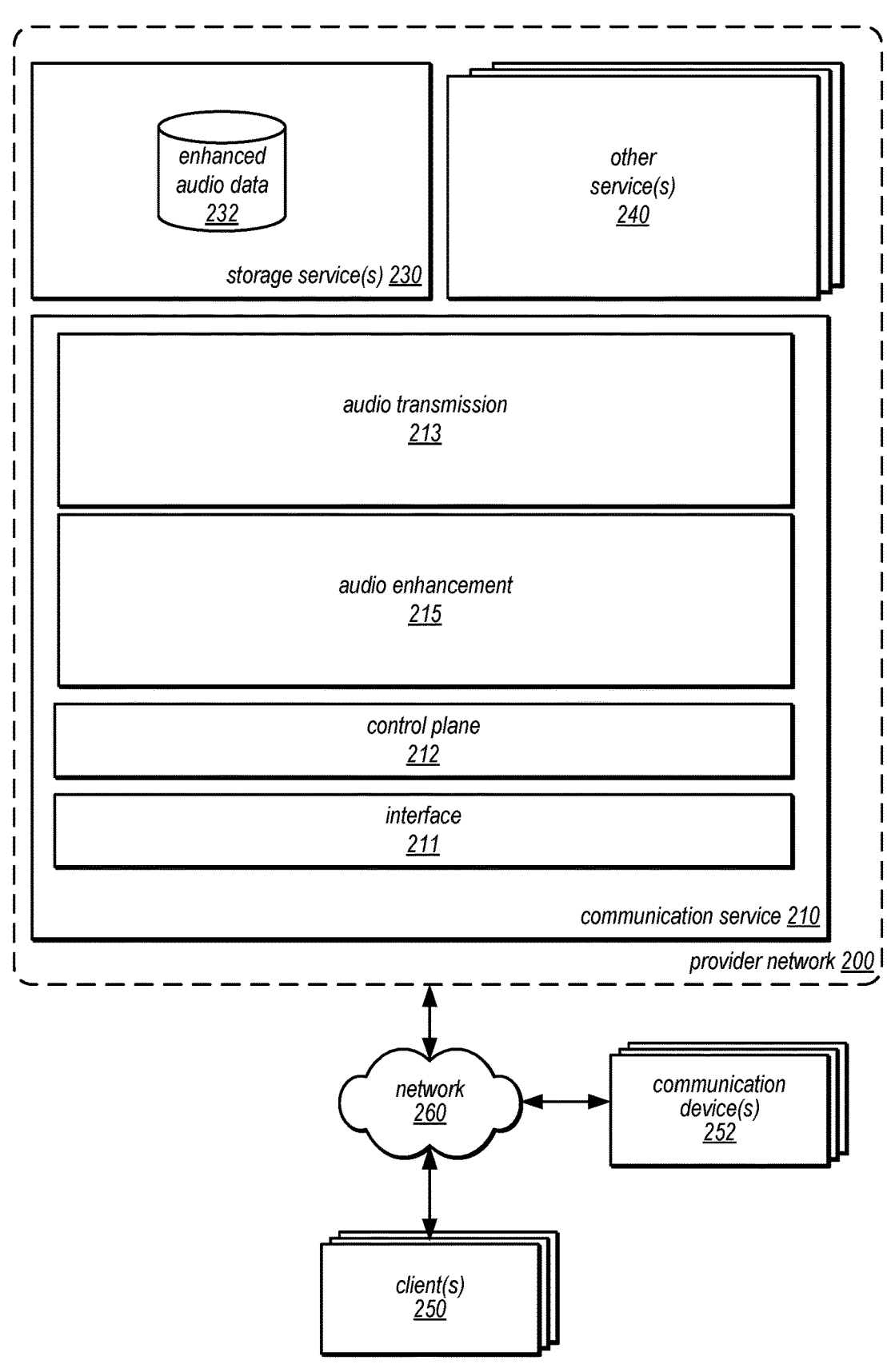
FIG. 2 illustrates an example provider network that may implement a communication service that implements per frame input estimation for post-filter echo suppression for two-way audio communication enhancement, according to some embodiments.

FIG. 2 illustrates an example provider network that may implement a communication service that implements per frame input estimation for post-filter echo suppression for two-way audio communication enhancement, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 6), needed to implement and distribute the infrastructure and services offered by the provider network 200, in one embodiment. In some embodiments, provider network 200 may implement various computing resources or services, such as communication service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 6 and described below, in one embodiment. In various embodiments, the functionality of a given system or service component (e.g., a component of communication service 210 may be implemented by a particular node or may be distributed across several nodes. In some embodiments, a given node may implement the functionality of more than one service system component (e.g., more than one data store component).

Communication service 210 may implement interface 211 to allow clients (e.g., client(s) 250 or clients implemented internally within provider network 200, such as a client application hosted on another provider network service like an event driven code execution service or virtual compute service) to send audio data for enhancement, storage, and/or transmission. In at least some embodiments, communication service 210 may also support the transmission of video data along with the corresponding audio data and thus may be an audio/video transmission service, which may perform the various techniques discussed above with regard to FIG. 1 and below with regard to FIGS. 3A-5 for audio data captured along with video data, in some embodiments. For example, communication service 210 may implement interface 211 (e.g., a graphical user interface, programmatic interface that implements Application Program Interfaces (APIs) and/or a command line interface) may be implemented so that a client application can submit an audio stream captured by communication device(s) 252 to be stored as enhanced audio data 232 stored in storage service(s) 230, or other storage locations or resources within provider network 200 or external to provider network 200 (e.g., on premise data storage in private networks). Interface 211 may allow a client to cause audio enhancement using the techniques discussed above with regard to FIG. 1 and below with regard to FIGS. 3A-5, (e.g., as part of audio transmission, such as voice transmission like Voice over IP (VOIP).

Communication service 210 may implement a control plane 212 to perform various control operations to implement the features of communication service 210. For example, control plane 212 may monitor the health and performance of requests at different components audio-transmission 213 and audio enhancement 215 (e.g., the health or performance of various nodes implementing these features of communication service 210). If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s) in various embodiments. For example, control plane 212 may receive requests interface 211 which may be a programmatic interface, and identify an available node to begin work on the request.

Figure 3B:
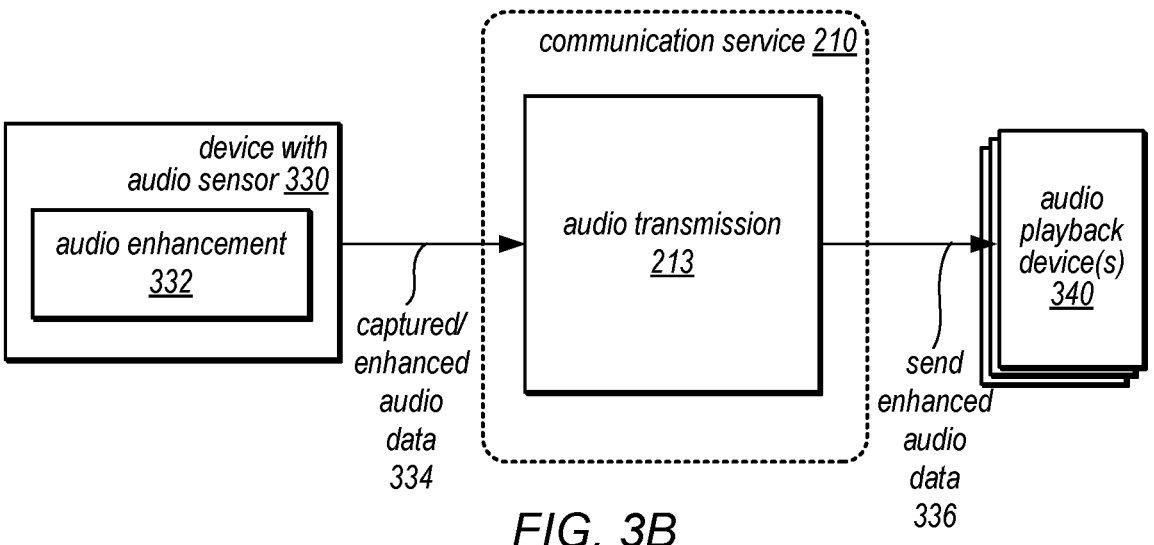

Communication service 210 may implement audio-transmission 213, which may facilitate audio communications (e.g., for audio-only, video, or other speech communications), speech commands or speech recordings, or various other audio transmissions, as discussed in the examples below with regard to FIGS. 3A and 3B. Communication service 210 may implement audio enhancement 215 to provide an audio enhancement system (e.g., like audio enhancement 100 in FIG. 1), which may implement per frame input estimation for post-filter echo suppression as discussed below with regard to FIGS. 4-5.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments. Data storage service(s) 230 may include object or file data stores for putting, updating, and getting data objects or files, in some embodiments. Data storage service(s) 230 may be accessed via programmatic interfaces (e.g., APIs) or graphical user interfaces. Enhanced audio 232 may be put and/or retrieved from data storage service(s) 230 via an interface for data storage services 230, in some embodiments.

Generally speaking, clients 250 may encompass any type of client that can submit network-based requests to provider network 200 via network 260, including requests for communication service 210 (e.g., a request to enhance, transmit, and/or store audio data). For example, a given client 250 may include a suitable version of a web browser, or may include a plug-in module or other type of code module that can execute as an extension to or within an execution environment provided by a web browser. Alternatively, a client 250 may encompass an application (or user interface thereof), a media application, an office application or any other application that may make use of communication service 210 (or other provider network 200 services) to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document or message-based network-based services architecture, or another suitable network-based services architecture.

In some embodiments, a client 250 may provide access to provider network 200 to other applications in a manner that is transparent to those applications. Clients 250 may convey network-based services requests (e.g., requests to interact with services like communication service 210) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Communication device(s) 252, may implement microphones that may, in various embodiments, collect, capture, and/or report various kinds of audio data, (or audio data as part of other captured data like video data). Communication device(s) 252 may be as various mobile or other communication and/or playback devices, such as microphones embedded in "smart-speaker" or other voice command-enabled devices. In some embodiments, some or all of audio enhancement techniques may be implemented as part of devices that include sensors 252 before transmission of enhanced audio to communication service 210, as discussed below with regard to FIG. 3B.

As discussed above, different interactions between sensors that capture audio data and services of a provider network 200 may invoke audio enhancement, in some embodiments. FIGS. 3A-3B illustrate logical block diagrams of different interactions of an audio sensor with provider network services, according to some embodiments. In FIG. 3A, audio sensor 310 may capture audio data from various environments, including speech audio from environments susceptible to echo as discussed above with regard to FIG. 1. Device with audio sensor 310 may send directly captured audio data 312 to communication service 210, in some embodiments, via an interface for communication service 210 (e.g., interface 211), such as by sending captured audio data 312 over wired or wireless network connection to communication service 210. In some embodiments, device with audio sensor 310 may provide the captured audio data to another device that sends the captured audio data 312 to communication service (not illustrated). Captured audio data may be transmitted as an audio file or object, or as a stream of audio, in some embodiments. For instance, for live communications, such as a VoIP call, captured audio data 312 may be a stream of audio data.

Communication service 210 may process captured audio data 312 through audio enhancement 215, in various embodiments. For example, a machine learning model discussed below with regard to FIG. 4 may be implemented to estimate the inputs to a post filter for echo suppression to generate enhanced audio data 314, including enhanced audio data that removes the echo without removing other audio data in captured audio data 312 as discussed above with regard to FIG. 1 and below with regard to FIGS. 4 and 5. Audio transmission 213 may receive the enhanced audio data 314, identify one or more destinations for the enhanced audio, such as one or more audio playback devices 320, and send the enhanced audio data 316 to one or more audio playback devices 320, in some embodiments. For example, a multi-way communication may include more than two participants using more than two communication devices, and the enhanced audio signal may be broadcast or otherwise transmitted to multiple recipient devices. Given the improvements to audio quality provided by audio enhancement, including the reduction of residual echo, audio playback device 320 may play the enhanced audio data 316 to one or more listeners (e.g., which may benefit from the improvements to the captured audio data in the form of more clear and perceptible speech).

Audio enhancement systems may also be implemented separately from communication service 210, in some embodiments. For example, as illustrated in FIG. 3B, device with audio sensor 330 may also implement audio enhancement 332, which may implement per frame input estimation for post-filter echo suppression like those discussed below with regard to FIG. 4 may be implemented to provide enhanced audio data 334, including enhanced audio data with joint noise and echo suppression as discussed above with regard to FIG. 1 and below with regard to FIGS. 4 and 6. Audio enhancement 332 may be implemented as part of other pre-transmission processing implemented by device with audio sensor 330, such as various encryption, compression, or other operations performed on capture audio data prior to transmission to communication service 210.

Device with audio sensor 330 may then send the capture/enhanced audio data 334 to communication service 210 for transmission (e.g., via interface 211), in some embodiments. Audio transmission 213 may receive the enhanced audio data 334, identify one or more destinations for the enhanced audio, such as one or more audio playback devices 340, and send the enhanced audio data 336 to audio playback device 340, in some embodiments.

Figure 4:
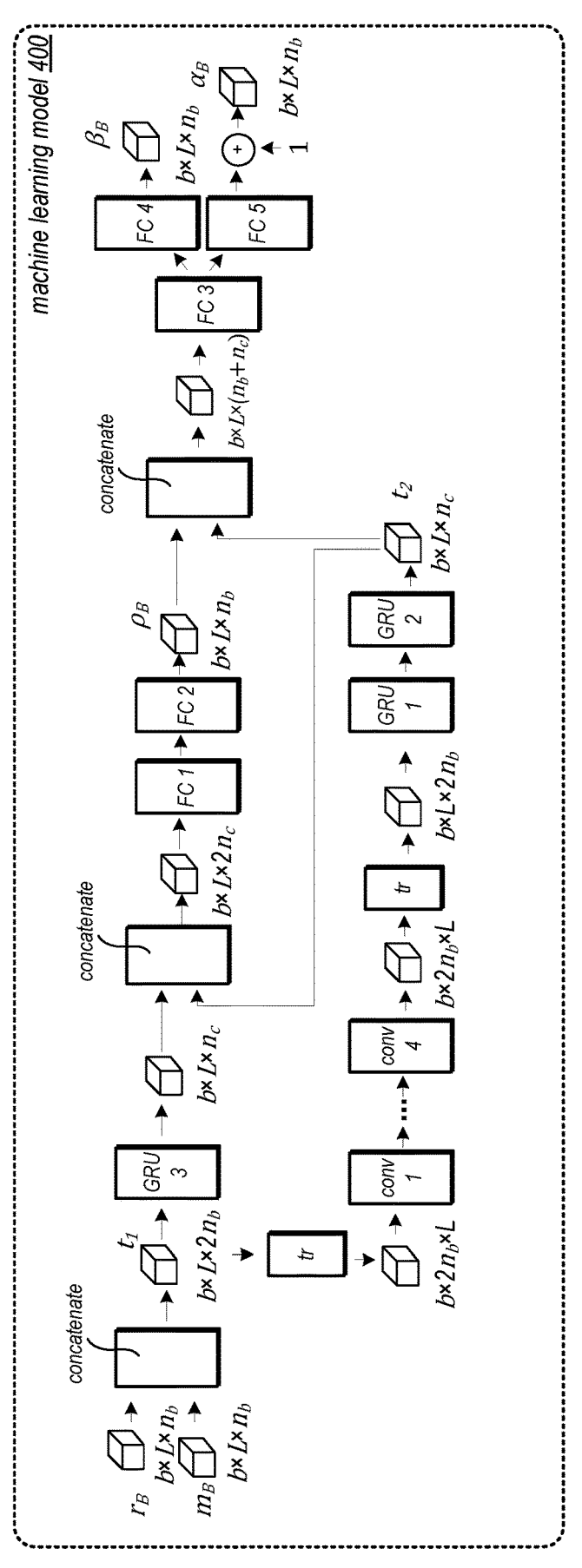
FIG. 4 illustrates a logical block diagram of an example machine learning model that estimates input for a post-filter applying echo suppression on a per frame basis, according to some embodiments.

As discussed above with regard to FIG. 1, audio enhancement may use a trained machine learning model that estimates inputs to a post filter for echo suppression given captured audio data and a reference signal (e.g., the far-end signal that is played via a speaker and, if included in the captured audio data, causes an echo). FIG. 4 illustrates a logical block diagram of an example machine learning model that estimates input for a post-filter applying echo suppression on a per frame basis, according to some embodiments.

In this architecture of machine learning model 400, there are 12 layers with trainable parameters. There are four convolutional layers (Conv 1-4), three Gated Recurrent Unit layers (GRU 1-3), and five fully connected layers (FC 1-5). These layers are exemplary. Other numbers and/or arrangements of layers may be implemented in other embodiments. The input to the network are the far-end signal in the bark scale $r_B$ and microphone signal in the bark scale $m_B$. During training, they may be fed in a sequence of L frames. The batch size may be denoted by b then the size of $r_B$ and $m_B$ would be $b \times L \times n_b$. These two tensors may be concatenated, which results in a tensor of size $b \times L \times 2n_b$ which is denoted by $t_1$. $t_1$ may be passed through two different paths. In the first path, the tensor may be transposed to be of the shape $b \times 2n_b \times L$ before feeding it into a convolutional layer (conv 1). In this way, the convolution operation happens in the sequence dimension. A kernel size, for instance, of 3, $2n_b$ output features and the padding of size 1 may be used in some embodiments. This results in the output tensor with a same size of the input tensor. Three more of such layers may be applied, in some embodiments. Then the tensor may be transposed to the original shape of $b \times L \times 2n_b$ before feeding it into two GRU layers (GRU 1 and GRU 2). The GRU layers may use 2 layers with $n_c$ cells, in some embodiments, which results in the output of size $b \times L \times n_c$ (referred to as $t_2$). The second path may be designed to act as a skip layer on $t_1$, passing $t_1$ through a GRU layer (GRU 3) which has 2 layers and $n_c$ cells. This layer may be set up to compensate for the delay in the echo path. Then, the output tensor of size $b \times L \times n_c$ may be concatenated with $t_2$. This results in a tensor of size $b \times L \times 2n_c$. Then, it may be passed through two fully connected layers (FC 1 and FC 2). FC 1 has the output size of $n_b$ with tanh as the output activation. FC 2 has the output size of $n_b$ with sigmoid as the output activation. The output of FC 2 gives the echo estimate mask $\rho_B$. Then, the echo estimate mask $\rho_B$ may be concatenated with $t_2$ which results in a tensor of size $b \times L \times (n_b + n_c)$. This tensor may be fed to fully connected layer FC 3. This layer may have the output size of $n_b$ and use tanh as the activation. The output may be fed into two separate fully connected layers. The first one, FC 4, which has the output size of $n_b$ and sigmoid as the output activation, is used to give the near-end estimate mask $\beta_B$. The second fully connected layer FC 5 also has the output size of $n_b$ and uses sigmoid as the output activation. After adding 1 to each output bin, the final value can be used as the estimate of attenuation parameter $\alpha_B$.

The following table describes some of the features illustrated in FIG. 4:

TABLE 1

| Layer | Input size | Output size | Kernel size | Padding | Activation |
|-------|-----------|-------------|-------------|---------|------------|
| Conv 1-4 | $2n_b$ | $2n_b$ | 3 | 1 | LeakyReLU |

| Layer | Input size | Output size | Number of layers | Bias | Activation |
|-------|-----------|-------------|------------------|------|------------|
| GRU 1 | $2n_b$ | $n_c$ | 2 | False | LeakyReLU |
| GRU 2 | $n_c$ | $n_c$ | 2 | False | LeakyReLU |
| GRU 3 | $2n_b$ | $n_c$ | 2 | False | LeakyReLU |

| Layer | Input size | Output size | Activation |
|-------|-----------|-------------|------------|
| FC 1 | 2nc | $n_b$ | Tanh |
| FC 2 | $n_b$ | $n_b$ | Sigmoid |
| FC 3 | $n_c + n_b$ | $n_b$ | Tanh |

TABLE 1-continued

| FC 4 | $n_b$ | $n_b$ | Sigmoid |
| FC 5 | $n_b$ | $n_b$ | Sigmoid |

The example machine learning model architecture 400 depicted in FIG. 4 successfully removes the echo and retains near-end signal. One of the reasons that this network is successful in doing so is that there is a dedicated section in the beginning of the network to estimate the echo mask. This allows network to learn about the echo path that the far-end signal has gone through which enables the network to be able to remove the echo.

Training a machine learning model to estimate attenuation parameters, echo estimates, and near-end estimates, such as the machine learning model architecture illustrated above may include using a number of one or more loss functions alone, or in combination, in order to train the machine learning model. Consider the following example loss functions with regard to machine learning model 400 (which may also be applicable to other machine learning model architectures that use the following inputs and produce similar outputs).

Consider the machine learning model's inputs and outputs. There are two inputs to the neural network, the far-end in bark scale, $r_B$ and microphone signal in the bark scale $m_B$. As mentioned before, there are three outputs, the attenuation parameter $\alpha_B$, the echo estimate mask $\rho_B$, and the near-end estimate mask $\beta_B$. Denoting the network functionality on the input by F, then it may be that:

$$\alpha_B, \rho_B, \beta_B = F(r_B, m_B) \tag{9}$$

One or a mix of different loss functions may be used network, in different embodiments. In order to be able to describe both the mix of possible loss functions, a the following loss functions may be introduced below.

One loss function may be weighted mean square error (WMSE), which may be described as $$WMSE(x, \hat{x}) = \frac{1}{Kn_f} \sum_{k=0}^{K-1} \sum_{i=0}^{n_f-1} w^2[l]|x[i, k] - \hat{x}[i, k]|^2 \tag{10}$$

where an example of w curve may be $$w = 0.1 + 0.5\log_{10}(0.04f + 1) + (\log_{10}(320 - 0.04f))^{0.2} \tag{11}$$

which may provide weighting of equal loudness contours.

Another function may be scaled weighted mean square error (SWMSE), which may be described as $$SWMSE(x, \hat{x}) = \frac{1}{Kn_f} \sum_{k=0}^{K-1} \sum_{i=0}^{n_f-1} w^2[l]|g(x[i, k]) - g(\hat{x}[i, k])|^2 \tag{12}$$

where $g(\cdot)$ is a function that scales its input. One option may be to use $g(x)=\log_{10}(x)$. Another option may be $g(x)=x^{0.2}$.

A first example of a loss function for training may be coupling loss. The machine learning models implemented in various embodiments may output the echo estimate mask $\rho_B$, and the near end estimate mask $\beta_B$ as different outputs. Since these two quantities are related, a coupling loss may be used to help the network converge faster. First, the estimated echo using echo estimate mask as $$\hat{d}_\rho[l, k] = \rho[l, k]m[l, k] \tag{13}$$

and then estimate the echo using the near end mask as $$\hat{d}_\beta[l, k] = m[l, k] - \beta[l, k]m[l, k] \tag{14}$$

such that the coupling loss may be determined as $$L_{coupling} = \frac{1}{Kn_f} \sum_{k=0}^{K-1} \sum_{i=0}^{n_f-1} \left\| |\hat{d}_\rho[l, k]| - |\hat{d}_\beta[l, k]| \right\|^2 \tag{15}$$

An echo estimate loss may also be used. The echo estimate loss may measure the difference between the estimated echo by applying echo estimate mask to the microphone signal and the actual echo signal. This loss uses weighted mean square error to measure the difference and may be described as $$L_{echo} = WMSE(d, \hat{d}_\rho) \tag{16}$$

An echo estimate scaled loss may also be used. This loss also measures the difference between the estimated echo and the actual echo but it uses the scaled mean square error to measure the difference and may be described as $$L_{scaled-echo} = SWMSE(d, \hat{d}_\rho) \tag{17}$$

A near-end estimate loss may also be used. The near end estimate loss may measure the difference between the estimated near-end by post-filter and the actual near-end signal and may be described as $$L_{nearend} = WMSE(s, s_{pf}) \tag{18}$$

where $s_{pf}$ may be the estimated near-end from the post filter. This loss may use the weighted means square error to measure the difference.

A near-end estimate scaled loss may also be used. A near-end estimate scaled loss may measure the difference between the estimated near-end and the actual near-end but it uses the scaled mean square error to measure the difference, and may be described as $$L_{scaled-nearend} = SWMSE(s, \hat{s}_\beta) \qquad (19)$$

where $\hat{s}_\beta[l, k] = \beta[l, k]m[l, k]$.

A microphone reconstruction loss may also be used. This loss may reconstruct the microphone signal using summation of the estimated near end and the estimated echo and measure how far it is from the actual microphone signal, and may be described as $$L_{mic} = WMSE(m, \hat{m}) \qquad (20)$$

where $\hat{m}[l, k] = \hat{s}_\beta[l, k] + \hat{d}_\rho[l, k]$.

In some embodiments, a combination of these losses may be used in training, such as a total loss described as $$L = L_{coupling} + L_{echo} + L_{scaled-echo} + L_{nearend} + L_{scaled-nearend} + L_{mic} \qquad (21)$$

In some embodiments, an Adam optimization technique may be used to train the machine learning model at different learning rates. For example, two different learning rates may be used to train the machine learning model, such as a slower rate like $l_\alpha = 1.25e-5$ for FC 4 (in FIG. 4) which is responsible for estimating a. The rest of the layers in the network are trained with a faster learning rate of $l_G = 1.25e-4$.

In some embodiments, the training data set may include a mix of clean speech, noisy speech, and music from different genres. A large set of room impulse responses may be used to create the echo signals. The echo signal may then be added to the near-end to obtain the microphone signal. A large amount of audio data (e.g., a month's worth of audio data) to train the neural network. To train the neural network, augmented data may be used as well. The following operations may be performed for the augmentation, adding a random delay to the echo signal, adding a clock skew to the echo signal, changing the echo to near-end ratio, applying a random equalization to the echo signal, mixing different near-end signals, and adding nonlinearity to the echo signal.

In view of the prior discussion of loss functions, training optimizations, and training data set, a training technique may include applying number of loss functions (discussed above) using a supervised training technique, which may include different learning rates, and use one loss function or a combination of loss functions to train the machine learning model. For example, in at least some embodiments, the machine learning model that accepts, as inputs, different sub-bands of a frame of the captured audio data and corresponding sub-bands of a corresponding frame of the far-end audio data, and generates, as outputs, post-filter inputs for the frame of the captured audio data, may be trained according to the various techniques discussed above (e.g., using a training data set of clean speech, noisy speech, and music from different genres and using a total loss function).

Although FIGS. 2-4 have been described and illustrated in the context of a provider network implementing a communication service, the various components illustrated and described in FIGS. 2-4 may be easily applied to other systems that implement audio enhancement for two-way audio communications. As such, FIGS. 2-4 are not intended to be limiting as to other embodiments of ratio mask post-filtering for audio enhancement.

FIG. 5 illustrates a high-level flowchart of various methods and techniques to implement per frame input estimation for post-filter echo suppression, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 510, captured audio data of a two-way communication may be obtained via a microphone in a location that includes a speaker that plays far-end audio data of the two-way communication. The location may be a same room, vicinity, or other proximity within which the microphone is capable of capturing the far-end audio data. While in some embodiments, the speaker and the microphone may be implemented in different devices, in other embodiments, the speaker and the microphone may be implemented as part of the same device.

As indicated at 520, individual frames of the captured audio data may be processed as different sub-bands of a sub-band domain, in some embodiments. For example, the captured audio data may be a time frequency domain signal divided into window of time (e.g., periods of 20 milliseconds), corresponding to different frames. In this way, the window of time may be rate at which the inputs are estimated, allowing estimated inputs to different from one frame to the next (unlike techniques that rely upon fixed input parameters, such as fixed attenuation). Then, a technique such as multi-hop complex modified discrete cosine transform (MH-CMDCT) may be used to transform a frame from the time domain to the sub-band domain. Note that other techniques to transform to sub-band domains may be used.

As indicated at 530, a machine learning model may be applied that is trained to accept, as inputs, different sub-bands of a frame of the captured audio data and corresponding sub-bands of a corresponding frame of the far-end audio data, such as the machine learning model depicted in FIG. 4. As discussed above, in at least some embodiments, the inputs of the captured audio data and the far-end audio data (which may cause the echo) may be input in a Bark scale format. Bark scale may group multiple sub-bands to have the same respective value (e.g., as input, or as discussed later, output), in some embodiments. Application of the machine learning model may generate, as outputs, post-filter inputs for the frame of the captured audio data, wherein the post filter inputs comprise an attenuation parameter, a near-end estimate, and echo estimate.

As indicated at 540, a post filter may be applied to the different sub-bands of the frame of the captured audio data according to the attenuation parameter and a ratio of the near-end estimate to the echo estimate to remove echo data caused by the far-end audio data in the captured audio data, in some embodiments. For example, as discussed above a Wiener filter may be implemented as the post filter.

By removing the echo data caused by the far-end audio data, the generated enhanced audio frames may not contain echo. The generated enhanced audio frames of the captured audio data may then be provided, as indicated at 550, to various destinations.

The methods described herein may in various embodiments be implemented by any combination of hardware and software. For example, in one embodiment, the methods may be implemented on or across one or more computer systems (e.g., a computer system as in FIG. 6) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 6:
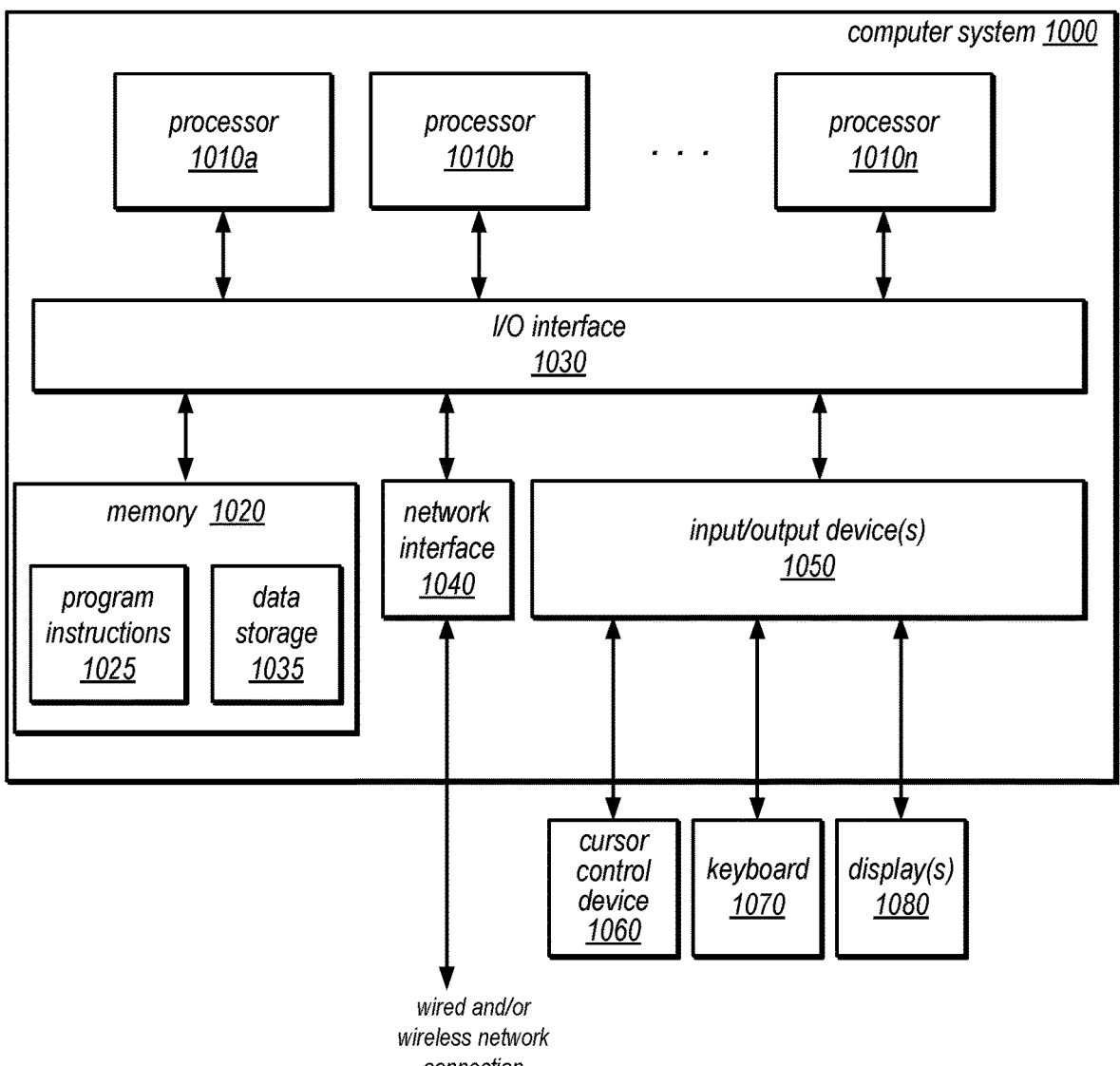
FIG. 6 illustrates an example system to implement the various methods, techniques, and systems described herein, according to some embodiments.

Embodiments of per frame input estimation for post-filter echo suppression, according to some embodiments. as described herein may be executed on one or more computer systems, which may interact with various other devices. One such computer system is illustrated by FIG. 6. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as ratio mask post-filtering for audio enhancement as described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 6, memory 1020 may include program instructions 1025, that implement the various methods and techniques as described herein, including the application of self-supervised training for audio anomaly detection and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link.

Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

a microphone;

a speaker at least one processor; and a memory, storing program instructions that when executed by the at least one processor, cause the at least one processor to:

receive captured audio data of a two-way communication via the microphone in a location that includes the speaker that plays far-end audio data of the two-way communication;

generate enhanced audio data from the captured audio data to suppress echo caused by inclusion of the far-end audio data in the captured audio data, wherein to generate the enhanced audio data, the program instructions cause the at least one processor to:

respectively process individual frames of the captured audio data in a sub-band domain as a plurality of different sub-bands, wherein to respectively process the individual frames, the program instructions cause the at least one processor to:

apply a machine learning model, trained to:

accept, as inputs, the plurality of different sub-bands of a frame of the captured audio data and corresponding sub-bands of a corresponding frame of the far-end audio data; and generate, as outputs, post-filter inputs for the frame of the captured audio data, wherein the post filter inputs comprise an attenuation parameter, a near-end estimate, and echo estimate;

apply a post-filter to the plurality of different sub-bands of the frame of the captured audio data according to the attenuation parameter and a ratio of the near-end estimate to the echo estimate to generate an enhanced frame to include as part of the enhanced audio data; and send the enhanced audio data to a destination.

2. The system of claim 1, wherein the attenuation parameter output for a first frame of the individual frames is different than the attenuation parameter output for a second frame of the individual frames.

3. The system of claim 1, wherein the machine learning model is a neural network comprising at least two paths, wherein one of the at least two paths is an echo path used to determine the echo estimate.

4. The system of claim 1, wherein the enhanced audio data is sent to the destination via a communication service implemented as part of a provider network.

5. A method, comprising:

obtaining captured audio data of a two-way communication via a microphone in a location that includes a speaker that plays far-end audio data of the two-way communication;

for individual frames of the captured audio data that are respectively processed as a plurality of different sub-bands:

applying a machine learning model, trained to:

accept, as inputs, the plurality of different sub-bands of a frame of the captured audio data and corresponding sub-bands of a corresponding frame of the far-end audio data; and generate, as outputs, post-filter inputs for the frame of the captured audio data, wherein the post filter inputs comprise an attenuation parameter, a near-end estimate, and echo estimate;

applying a post-filter to the plurality of different sub-bands of the frame of the captured audio data according to the attenuation parameter and a ratio of the near-end estimate to the echo estimate to remove echo data caused by the far-end audio data in the captured audio data to generate an enhanced frame of the captured audio data; and providing the generated enhanced frames of the captured audio data.

6. The method of claim 5, wherein the attenuation parameter output for a first frame of the individual frames is different than the attenuation parameter output for a second frame of the individual frames.

7. The method of claim 5, wherein the machine learning model is a neural network comprising at least two paths and wherein one of the at least two paths is an echo path used to determine the echo estimate.

8. The method of claim 5, wherein the attenuation parameter is provided as the post-filter input to the post-filter in a Bark scale.

9. The method of claim 5, wherein the individual frames are determined according to a window of time and wherein the window of time indicates a rate which the post-filter inputs are generated for the captured audio data.

10. The method of claim 5, wherein the plurality of different sub-bands of the frame of the captured audio data and the corresponding sub-bands of the corresponding frame of the far-end audio data are provided as inputs to the machine learning model in Bark scales.

11. The method of claim 5, further comprising training the machine learning model using a total loss function that combines a coupling loss, echo loss, scaled-echo loss, near-end loss, scaled near-end loss, and microphone loss, the total loss function being applied using a supervised learning technique with respect to a training data set comprising clean speech, noisy speech and music.

12. The method of claim 5, wherein the obtaining the captured audio data, the applying the machine learning model, the applying the post filter, and the providing the enhanced audio frames is performed by a communication service implemented as part of a provider network.

13. The method of claim 5, wherein the generated enhanced audio frames are provided to a destination via a communication service implemented as part of a provider network.

14. One or more non-transitory, computer-readable storage media, storing program instructions that when executed on or across one or more computing devices cause the one or more computing devices to implement:

receiving captured audio data of a two-way communication via a microphone in a location that includes a speaker that plays far-end audio data of the two-way communication;

for individual frames of the captured audio data that are respectively processed as a plurality of different sub-bands:

applying a machine learning model, trained to:

accept, as inputs, the plurality of different sub-bands of a frame of the captured audio data and corresponding sub-bands of a corresponding frame of the far-end audio data; and generate, as outputs, post-filter inputs for the frame of the captured audio data, wherein the post filter inputs comprise an attenuation parameter, a near-end estimate, and echo estimate;

applying a post-filter to the plurality of different sub-bands of the frame of the captured audio data according to the attenuation parameter and a ratio of the near-end estimate to the echo estimate remove echo data caused by the far-end audio data in the captured audio data to generate an enhanced frame of the captured audio data; and sending the generated enhanced frames of the captured audio data to a destination.

15. The one or more non-transitory, computer-readable storage media of claim 14, wherein the attenuation parameter output for a first frame of the individual frames is different than the attenuation parameter output for a second frame of the individual frames.

16. The one or more non-transitory, computer-readable storage media of claim 14, wherein the machine learning model is a neural network comprising at least two paths, wherein one of the at least two paths is an echo path used to determine the echo estimate.

17. The one or more non-transitory, computer-readable storage media of claim 14, wherein the attenuation parameter is provided as the post-filter input to the post-filter in a Bark scale.

18. The one or more non-transitory, computer-readable storage media of claim 14, wherein the individual frames are determined according to a window of time and wherein the window of time indicates a rate which the post-filter inputs are generated for the captured audio data.

19. The one or more non-transitory, computer-readable storage media of claim 14, wherein the plurality of different sub-bands of the frame of the captured audio data and the corresponding sub-bands of the corresponding frame of the far-end audio data are provided as inputs to the machine learning model in Bark scales.

20. The one or more non-transitory, computer-readable storage media of claim 14, wherein the one or more computing devices is a communication device that is a participant in the two way communication that includes the microphone and the speaker.

\*    \*    \*    \*    \*